UNITED STATES PATENT OFFICE.

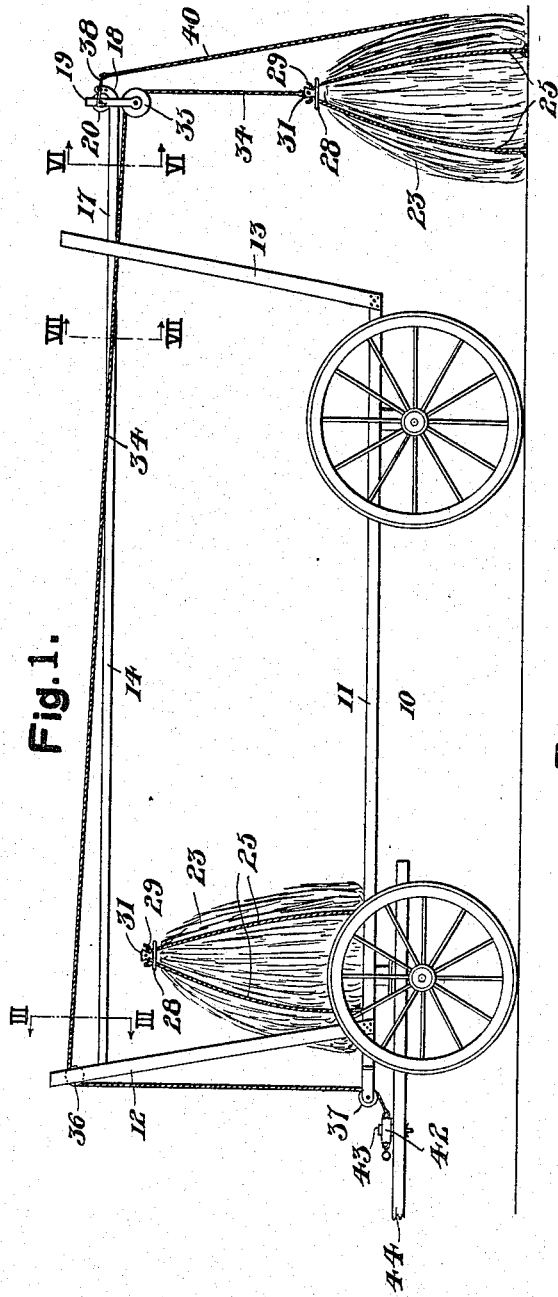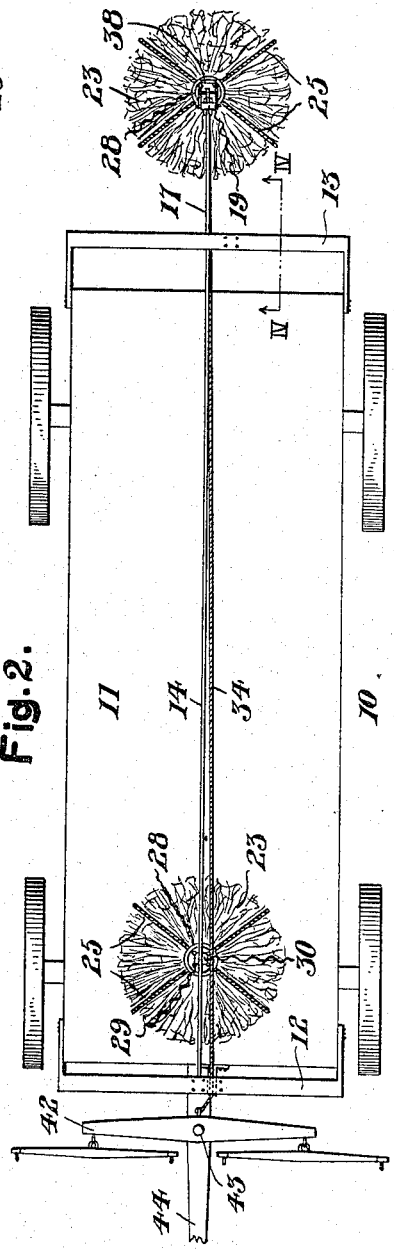

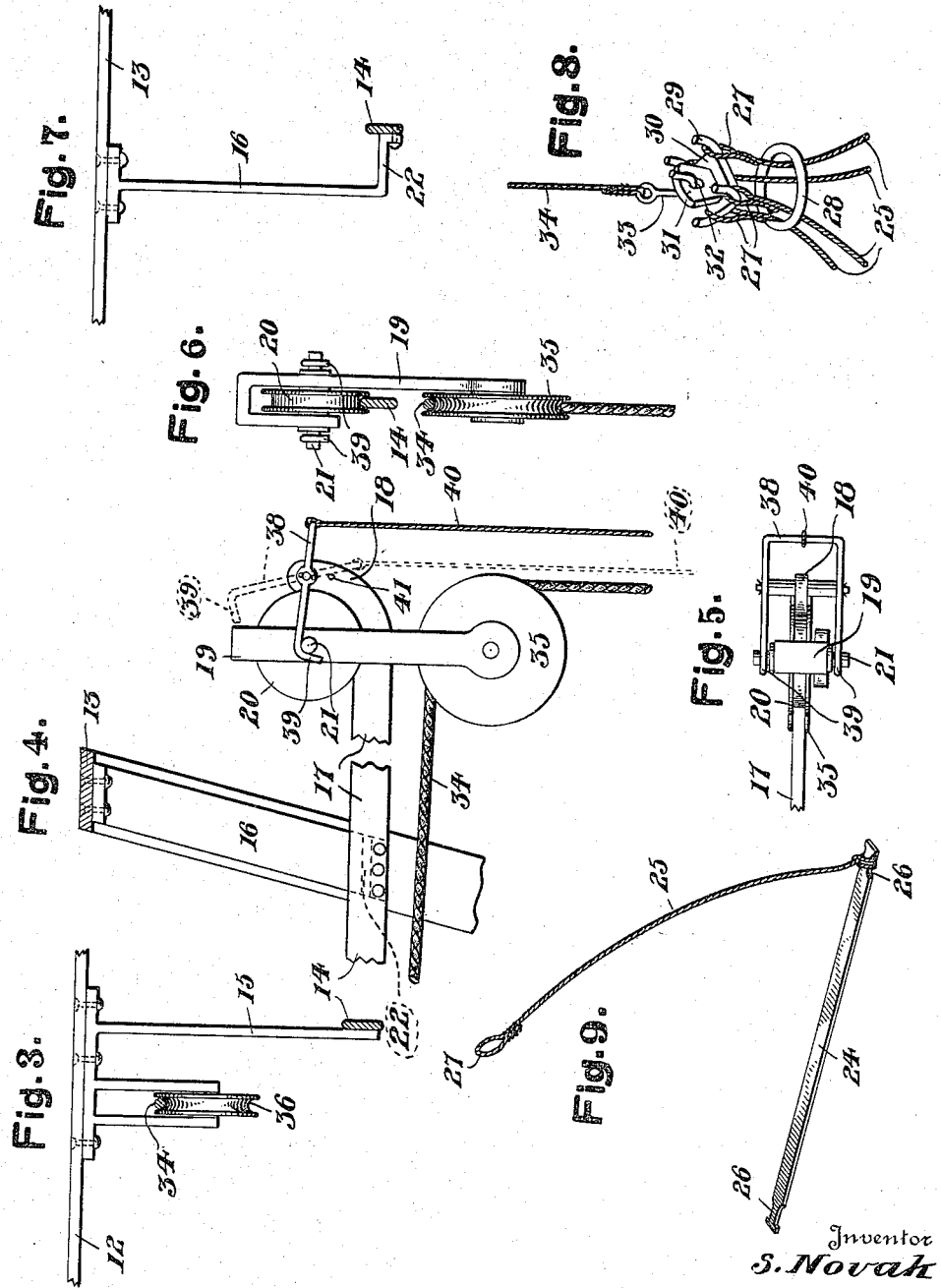

SYLVESTER NOVAK, OF WINCHESTER, WISCONSIN.

WAGON-LOADING DEVICE.

1,176,237.  Specification of Letters Patent.  Patented Mar. 21, 1916.

Application filed September 23, 1915. Serial No. 52,271.

*To all whom it may concern:*

Be it known that I, SYLVESTER NOVAK, a subject of the Czar of Russia, residing at Winchester, in the county of Vilas and State of Wisconsin, have invented certain new and useful Improvements in Wagon-Loading Devices, of which the following is a specification.

This invention relates to certain new and useful improvements in wagon loading devices.

The primary object of this invention is the provision of a loading device carried by a transporting wagon, whereby the wagon may be readily loaded with cotton, hay or other similar produce from the field in which the same is grown.

A further object is the provision of a loading means upon a wagon adapted for operation by the horses attached to the vehicle, whereby any desired produce may be raised off of the ground rearwardly of the wagon and then moved forwardly to the desired position thereon.

A still further object is the provision of a loading device adapted to gather in bales the produce desired to be loaded and then to elevate and move the same to the desired position, a releasing device for the bale being provided and also a return of the operating mechanism.

With these general objects in view and others that will appear as the nature of the invention is better understood the same consists in the novel combination and arrangement of parts hereinafter more fully described, illustrated in the accompanying drawings, and pointed out in the appended claims.

In the drawings forming a part of this application and in which like-designating characters refer to corresponding parts throughout the several views:—Figure 1 is a side elevation of a wagon provided with the present device. Fig. 2 is a top plan view thereof. Fig. 3 is an enlarged detail sectional view taken upon line III—III of Fig. 1. Fig. 4 is a similar view taken upon line IV—IV of Fig. 2. Fig. 5 is an enlarged top plan view of the rearwardly positioned catch mechanism. Fig. 6 is an enlarged sectional view taken upon line VI—VI of Fig. 1. Fig. 7 is a similar view taken upon line VII—VII of Fig. 1. Fig. 8 is an enlarged perspective view of the bale securing means, and Fig. 9 is a similar view of one of the bale binders.

Referring more in detail to the drawings, it being understood that the present device is arranged for removing cotton, hay or other similar land products from the field within which the same is grown, it will be noted that any desired form of wagon or truck 10 is provided having a supporting platform or bottom 11 adapted to receive the goods to be transported.

Front and rear yoke-shaped frames 12 and 13 respectively are carried by the platform 11 and a longitudinally extending beam 14 connects the two frames 12 and 13, being substantially centrally suspended therefrom by means of similar brackets 15 and 16 respectively. The beam 14 is provided with a rear extension 17 terminating in a curved upturned end 18 and a carrier 19 is adapted to travel upon the beam 14 by means of a roller 20 having oppositely projecting axle ends 21 and journaled in the said carrier, it being understood that the bracket 16 is offset at the bottom thereof as at 22 for allowing the carrier 19 freely to pass the said bracket upon the beam or track 14.

The hay, cotton or other product of the land having been first severed from the soil is gathered in separate bales as 23 and a plurality of binders of the form best illustrated in Figs. 8 and 9 are then employed for securing the bales together. Each of the said binders consists of a bottom strip 24 positionable beneath the bale and has a cord 25 secured to the reduced opposite ends 26 thereof. While the opposite ends of the cords are provided with loops 27 projected through a positioning ring 28 above the bale 23 and then retained upon the corner hooks 29 of a spider 30.

The spider 30 is provided with a central lug 31 having a perforation 32 adapted to receive a hook 33 attached to the rear end of an operating cable 34, the said cable then passing over a pulley 35 depending from the carrier 19 and extending forwardly over the pulley 36 carried by the front frame 12 and then over a similar pulley 37 positioned therebeneath at the forward end of the platform 11.

A latch 38 is pivoted to the beam end 18 and is arranged in the form of a fork having opposite end hooks 39 adapted to engage over the axle ends 21 of the carrier 19 when the carrier is at its extreme rear position in engagement with the beam end 18 forming a stop for the carrier. The hooked ends 39 of the latch 38 are of sufficient weight normally to engage the latch against the axle ends 21 when the carrier is at its extreme rear position and an operating pull cord 40 is secured to the rear end of the latch whereby the latch may be readily released where desired, a stop pin 41 being provided upon the beam end 18 for limiting the movement of the said latch.

With the goods to be loaded such as cotton, arranged in the field in bales 23, the horse-drawn wagon 10 may be readily positioned for attaching the cable hook 33 to the bale spider 30 at the rear of the wagon. The forward end of the said cable 34 is secured to the draft whiffle-tree 42 and when desired to move the bale 23 the whiffle-tree bolt 43 is withdrawn from its engagement with the tongue 44 of the wagon whereupon the forward movement of the horses elevates the bale 23 to a level above the platform 11 and the latch 38 being released by pulling the cord 40 the further forward movement of the horses draws the bale forwardly to the desired position upon the platform 11, whereupon the cable hook 33 may be removed from the bale and the carrier 19 moved rearwardly upon the yoke beam 14 until the elements return to their normal positions ready for elevating and loading a succeeding bale. In this manner, the wagon may be completely filled with the bales and the bolt 43 then returned to its position in the wagon tongue 44, the horses may be employed for hauling the wagon-load of bales to a desirable place of storage.

While the form of the invention herein shown and described is what is believed to be the preferred embodiment thereof, it is nevertheless to be understood that minor changes may be made therein without departing from the spirit and scope of the invention as claimed.

What I claim as new is:—

1. A device of the class described comprising a platform, frames at the opposite ends thereof, a track beam centrally suspended from the said platform and having a rear extention terminating in a curved upturned stop portion, a wheeled carrier slidably positioned upon the said track, a forked retaining latch for the said carrier carried by the upturned end of the track and adapted to engage the bearing for the wheel to prevent movement of the carrier over the track, a whiffle-tree positioned forwardly of the said platform and a hoisting rope engaging the said carrier adjacent one end of the rope and attached to the said whiffle-tree at the opposite end thereof.

2. A hoisting device comprising in combination with a platform, opposite yoke-shaped frames upon the said platform, a centrally arranged track beam suspended from the said frames and having a rear extension terminating in a curved stop portion, a removable draft whiffle-tree positioned forwardly of the said platform, a carrier adapted to travel upon the said track, pulleys carried by the forward end of the said platform, the upper portion of the said forward frame and by the said carrier, a hoisting rope passing over the said pulleys and having its forward end secured to the said whiffle-tree, the axle for the carrier projecting from each side thereof, a forked latch carried by the curved portion of the track, terminal hooks carried by the latch legs adapted to engage the axial extensions to arrest movement of the carrier, and means for disengaging the latch from the carrier.

In testimony whereof I affix my signature in presence of two witnesses.

SYLVESTER NOVAK.

Witnesses:
W. T. LENNON,
H. PAWLICHI.